US010260410B2

(12) United States Patent
Choi et al.

(10) Patent No.: US 10,260,410 B2
(45) Date of Patent: Apr. 16, 2019

(54) VARIABLE COMPRESSION RATIO DEVICE AND CONTROL METHOD THEREOF

(71) Applicants: Hyundai Motor Company, Seoul (KR); Kia Motors Corporation, Seoul (KR)

(72) Inventors: Myungsik Choi, Seoul (KR); Won Gyu Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/829,621

(22) Filed: Dec. 1, 2017

(65) Prior Publication Data

US 2019/0055885 A1 Feb. 21, 2019

(30) Foreign Application Priority Data

Aug. 16, 2017 (KR) ........................ 10-2017-0103408

(51) Int. Cl.
*F02B 75/04* (2006.01)
*F02D 15/00* (2006.01)
(Continued)

(52) U.S. Cl.
CPC .............. *F02B 75/04* (2013.01); *F02D 15/02* (2013.01); *F16C 7/06* (2013.01); *G01M 15/06* (2013.01); *F15B 15/12* (2013.01)

(58) Field of Classification Search
CPC ...... F02B 75/04; F02B 75/044; F02B 75/045; F16C 7/06; F02D 15/00; F02D 15/02
(Continued)

(56) References Cited

U.S. PATENT DOCUMENTS 4,834,031 A * 5/1989 Katoh ...................... F02B 75/04 123/48 R
4,864,975 A * 9/1989 Hasegawa ............. F02B 75/045 123/48 B
(Continued)

FOREIGN PATENT DOCUMENTS

JP 2015137768 A * 7/2015 ............ F02B 75/044
KR 10-2010-0062721 A 9/2010
WO WO 2015200432 A1 * 12/2015 ................ F16C 7/06

*Primary Examiner* — Grant Moubry
*Assistant Examiner* — James G Moubry
(74) *Attorney, Agent, or Firm* — Mintz Levin Cohn Ferris Glovsky and Popeo, P.C.; Peter F. Corless

(57) ABSTRACT

A variable compression ratio device is provided. The device includes a connecting rod connected to a piston in a cylinder and an eccentric cam interposed between a piston pin and the connecting rod. The eccentric cam moves the piston vertically to vary a compression ratio according to an eccentric cam rotation position. A hydraulic controller adjusts hydraulic fluid supplied to first and second chambers formed between the eccentric cam and the connecting rod. The first chamber rotates the eccentric cam in one direction by supplied hydraulic fluid. The second chamber rotates the eccentric cam in another direction by the supplied hydraulic fluid. A position sensor senses a piston position. A compression ratio controller calculates a target compression ratio according to an operating condition of an engine, calculates a current compression ratio based on the piston, and adjusts the eccentric cam rotation position using an oil control valve.

17 Claims, 13 Drawing Sheets

(51) Int. Cl.

| | |
|---|---|
| ***F02D 15/02*** | (2006.01) |
| ***G01M 15/06*** | (2006.01) |
| ***F16C 7/06*** | (2006.01) |
| *F15B 15/12* | (2006.01) |

(58) Field of Classification Search
USPC ................................................ 123/48 B, 78 E
See application file for complete search history.

(56) References Cited

U.S. PATENT DOCUMENTS

| | | | | |
|---|---|---|---|---|
| 6,752,105 | B2 * | 6/2004 | Gray, Jr. | F02B 75/045<br>123/48 B |
| 6,966,282 | B2 * | 11/2005 | Hirano | F02B 75/044<br>123/48 B |
| 8,065,909 | B2 * | 11/2011 | Rabhi | F01B 9/047<br>73/114.16 |
| 10,006,482 | B2 * | 6/2018 | Kim | F02B 75/045 |
| 2010/0294232 | A1 * | 11/2010 | Otterstrom | F01B 9/047<br>123/197.1 |
| 2012/0247425 | A1 * | 10/2012 | Richard | F01L 7/021<br>123/43 R |
| 2017/0159559 | A1 * | 6/2017 | Meacham | F16C 7/06 |
| 2017/0268419 | A1 * | 9/2017 | Kim | F02B 75/04 |

* cited by examiner

FIG. 8

MAXIMUM COMPRESSION RATIO (13)

MINIMUM COMPRESSION RATIO (8)

| COMPRESSION RATIO | 13 | 12 | 11 | 10.5 | 10 | 9 | 8 | ratio |
|---|---|---|---|---|---|---|---|---|
| SIGNAL SENSING CRANK VALUE | 93.2 | 91.9 | 90.7 | 90 | 89.4 | 88.2 | 86.8 | Crank degree |

ENLARGED VIEW OF REGION "D" OF FIG. 10A

FIG. 11

| COMPRESSION RATIO | SENSED POSITION WHEN DESCENDING | REFERENCE POSITION | SENSED POSITION WHEN ASCENDING | DURATION VALUE |
|---|---|---|---|---|
| MAXIMUM COMPRESSION RATIO | 163 | 180 | 195 | 32 |
| ↑ | 157 | 180 | 201 | 44 |
| | 153 | 180 | 206 | 53 |
| | 149 | 180 | 210 | 61 |
| ↓ | 145 | 180 | 214 | 69 |
| MINIMUM COMPRESSION RATIO | 142 | 180 | 217 | 75 |

VARIABLE COMPRESSION RATIO DEVICE AND CONTROL METHOD THEREOF

CROSS-REFERENCE TO RELATED APPLICATION

This application claims the benefit of priority to Korean Patent Application No. 10-2017-0103408 filed in the Korean Intellectual Property Office on Aug. 16, 2017, the entire contents of which are incorporated by reference as if fully set forth herein.

BACKGROUND OF THE DISCLOSURE

(a) Technical Field

The present disclosure relates generally to variable compression ratio devices and, more particularly, to a variable compression ratio device for continuously varying a compression ratio within a combustion chamber of an internal combustion engine according to operating conditions of an engine to enhance fuel efficiency and power, and a control method thereof.

(b) Description of the Related Art

In a typical internal combustion engine, air or a fuel-air mixture flows to a combustion chamber of the engine, and a piston is lifted to compress a combustion chamber gas to a preset compression ratio. A variable compression ratio (VCR) device varies the compression ratio of a combustion chamber. Specifically, a compression ratio of gas flowing to the combustion chamber of the engine is changed according to an operational state of the engine. In operation, the VCR device increases the compression ratio in a low-load condition of the engine to enhance combustion efficiency and lowers the compression ratio in a high-load condition of the engine to reduce efficiency.

In order to follow the current exhaust gas regulations, a diesel engine implements low temperature combustion by reducing a compression ratio of a piston combustion chamber. Since cold-start performance is degraded in response to a reduction in compression ratio, a combustion chamber preheating device is required.

In addition, the VCR device is equipped in a component which rotates or reciprocates to move, such as a piston, a connecting rod, a crank shaft, or the like. Thus, a VCR device with a complex structure or an increase in weight may suffer from degraded efficiency.

As such, research has been conducted into a relatively simple structure for varying a compression ratio by controlling a position of a piston. A typical example of the recently developed VCR device is a device in which an eccentric cam is disposed between a piston pin and a connecting rod. A piston is lifted or lowered by rotating the eccentric cam through a hydraulic fluid (or oil) to vary a compression ratio.

Since it is difficult to accurately and continuously control a compression ratio of the piston, two stages are controlled (e.g., a highest compression ratio and a lowest compression ratio). Research has been conducted into a device and method for sensing a current compression ratio and causing the current compression ratio to reach a target compression ratio.

The above information disclosed in this Background section is only for enhancement of understanding of the background of the disclosure, and therefore it may contain information that does not form the related art.

SUMMARY OF THE DISCLOSURE

The present disclosure has been made in an effort to provide a variable compression ratio device that senses a compression ratio of a combustion chamber according to operating conditions of the engine and causes the sensed compression ratio to reach a target compression ratio. The variable compression ratio device has advantages of reducing fuel consumption and enhancing power.

According to embodiments of the present disclosure, a variable compression ratio device includes: a connecting rod connected to a piston disposed in a cylinder through a piston pin; an eccentric cam interposed between the piston pin and the connecting rod, the eccentric cam moving the piston up and down to vary a compression ratio according to a rotation position of the eccentric cam; a hydraulic controller controlling hydraulic fluid supplied to each of first and second chambers formed between the eccentric cam and the connecting rod, the first chamber rotating the eccentric cam in one direction by supplied hydraulic fluid, and the second chamber rotating the eccentric cam in another direction by the supplied hydraulic fluid; a position sensor sensing a position of the piston; and a compression ratio controller calculating a target compression ratio according to an operating condition of an engine, calculating a current compression ratio based on the piston using a signal sensed by the position sensor, and controlling the rotation position of the eccentric cam through an oil control valve to cause the current compression ratio to reach the target compression ratio. The compression ratio controller varies the rotation position of the eccentric cam according to a difference between the calculated target compression ratio and the calculated current compression ratio.

The variable compression ratio device may further include: a crank pin of a crank shaft connected to an end of the connecting rod; and a crank angle sensor sensing a rotation position of the crank shaft.

The position sensor may include a first sensor element fixed to a side of the piston; and a second sensor element mounted on the engine and configured to sense a position of the first sensor element.

The second sensor element may be disposed in a region in which the first sensor element descends and ascends in correspondence with a movement of the piston.

At a minimum compression ratio position of the piston, the first sensor element may be disposed in a position higher than a bottom dead center (BDC) of the second sensor element by a preset distance.

The compression ratio controller may calculate: i) a first crank angle at a point at which the second sensor senses the first sensor when the first sensor element descends, ii) a second crank angle at a point at which the second sensor element senses the first sensor element when the first sensor element, which has descended, ascends, and iii) the current compression ratio as according to a difference between the first crank angle and the second crank angle.

The compression ratio controller may calculate the target compression ratio based on a rotation speed of the crank shaft and a target injection amount of fuel.

The connecting rod may have a first chamber connection passage connected to the first chamber and a second chamber connection passage connected to the second chamber.

A recess to which a hydraulic fluid is supplied may be provided on a side of an outer circumferential surface of the eccentric cam, and a protrusion dividing the recess into the first chamber and the second chamber may be provided on an inner circumferential surface of the connecting rod.

A sealing member sliding to a bottom surface of the recess and sealing the first chamber and the second chamber from each other may be disposed at a front end of the protrusion.

The hydraulic controller may include: a spool valve supplying a hydraulic fluid to the first chamber or the second chamber; an oil control valve controlling the spool valve; and an oil pump pumping hydraulic fluid to the oil control valve.

The first sensor element may include a magnetic component, and the second sensor element may sense magnetism.

Furthermore, according to embodiments of the present disclosure, a method for controlling a variable compression ratio device includes: sensing, by a position sensor, a position signal of a piston; calculating, by a compression ratio controller, a current compression ratio using the position signal of the piston; calculating, by the compression ratio controller, a target compression ratio according to an operating condition of an engine; calculating, by the compression ratio controller, a difference between the calculated current compression ratio and the calculated target compression ratio; and controlling, by the compression ratio controller, a compression ratio of the piston according to the calculated difference to cause the current compression ratio to reach the target compression ratio.

The calculating of the current compression ratio may include: calculating, by the compression ratio controller, a duration value between a first point at which the piston descends and a second point at which the piston, which has descended, ascends, and calculating, by the compression ratio controller, the current compression ratio so as to correspond to the duration value.

The first point and the second point may be first and second crank angles, respectively, of the crank shaft, and the duration value is a difference of the first and second crank angles.

The target compression ratio may be calculated based on at least one of an RPM of the engine, an injection amount of fuel, and an operation load.

The method may further include: maintaining, by the compression ratio controller, the current compression ratio when an absolute value of a difference between the current compression ratio and the target compression ratio does not deviate from the set value; and changing, by the compression ratio controller, the current compression ratio so as to correspond to the target compression ratio when the absolute value of the difference value deviates from the set value.

Furthermore, according to embodiments of the present disclosure, a variable compression ratio device includes: a piston disposed in a cylinder; and a position sensor sensing a position of the piston.

The position sensor may include: a first sensor element fixed to a side of the piston; and a second sensor element mounted to an engine and configured to sense a position of the first sensor element.

The second sensor element may be disposed in a region in which the first sensor element descends and ascends in correspondence with a movement of the piston.

The variable compression ratio device according to embodiments of the present disclosure may easily calculate a current compression ratio based on the piston using the position sensor sensing a position of the piston. Also, a target compression ratio selected according to operating conditions of the engine and a calculated current compression ratio may be compared and the current compression ratio may be controlled to reach the target compression ratio. Thus, since combustion efficiency is enhanced by precisely controlling a compression ratio under a low load condition and a high load condition of the engine, fuel consumption may be positively reduced according to the operating conditions.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

FIG. 8 is a table illustrating crank angles at which a first sensor element is sensed according to compression ratios of FIG. 7.

FIG. 11 is a table illustrating time points at which a first sensor element is sensed in a variable compression ratio device according to embodiments of the present disclosure.

Figure 1:
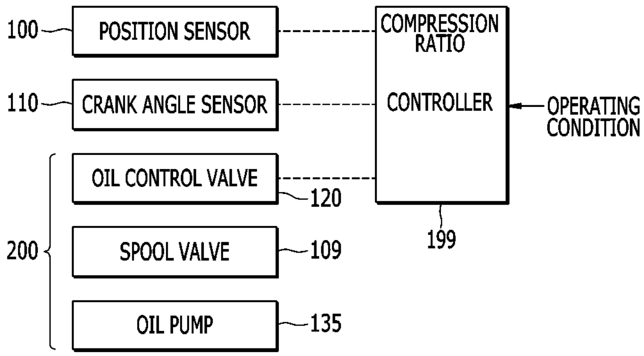
FIG. 1 is a block diagram schematically illustrating a configuration of a variable compression ratio device according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, certain embodiments of the present disclosure will be described in detail with reference to the accompanying drawings. In the drawings, sizes and thickness of components are arbitrarily shown for the description purposes, so the present disclosure is not limited to the illustrations of the drawings and thicknesses are exaggerated to clearly express various parts and regions. The drawings and description are to be regarded as illustrative in nature and not restrictive, and like reference numerals designate like elements throughout the specification.

In the following descriptions, terms such as "first" and "second," etc., may be used only to distinguish one component from another as pertinent components are named the same, and order thereof is not limited. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to embodiments of the present disclosure, FIG. 1 is a block diagram schematically illustrating a configuration of a variable compression ratio device according to embodiments of the present disclosure.

As shown in FIG. 1, the variable compression ratio device includes a compression ratio controller 199, a hydraulic controller 200, a position sensor 100, and a crank angle sensor 110, and the hydraulic controller 200 includes an oil pump 135, a spool valve 109, and an oil control valve 120.

The position sensor 100 senses a position of a piston 500 (see FIG. 4) provided in a cylinder of an engine, and the crank angle sensor 110 senses a rotation position of a crank shaft 500 (see FIG. 4), and the sensed signal is transmitted to the compression ratio controller 199.

Figure 5:
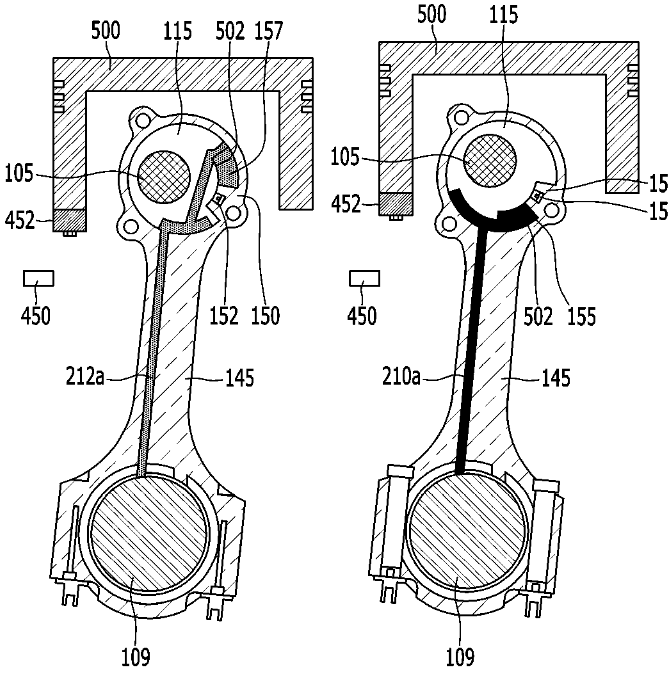
FIG. 5 is a partial cross-sectional view illustrating a variable compression ratio device according to embodiments of the present disclosure.

In embodiments of the present disclosure, the position sensor 100 includes a first sensor element 452 and a second sensor element 450 as illustrated in FIG. 5, and the crank angle sensor 110 may refer to a known art.

The compression ratio controller 199 may vary a compression ratio of the engine by varying a position of the piston 500 by controlling the oil control valve 120 according to a signal sensed by the sensor and operating conditions (e.g., RPM, an injection amount of fuel, etc.).

Details thereof will be described with reference to FIGS. 2 to 12 hereinafter.

Figure 2:
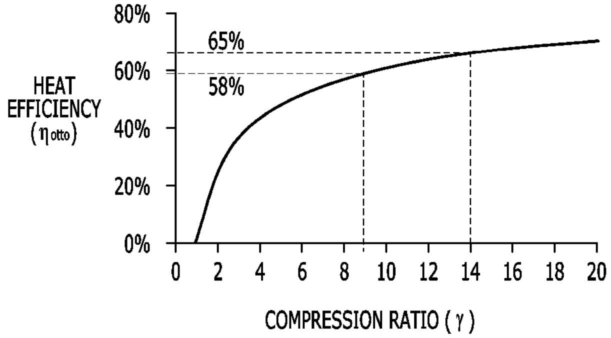
FIG. 2 is a graph illustrating a relation between compression ratio and heat efficiency according to embodiments of the present disclosure.

FIG. 2 is a graph illustrating a relation between compression ratio and heat efficiency according to embodiments of the present disclosure.

As shown in FIG. 2, the horizontal axis represents compression ratios of a combustion chamber at a top dead center of the piston, and the vertical axis represents heat efficiency. As a compression ratio is high, heat efficiency tends to be increased.

In particular, according to operating conditions, a compression ratio may be reduced in a high-load region to reduce knocking and increased in a low-load region to enhance heat efficiency.

Figure 3:
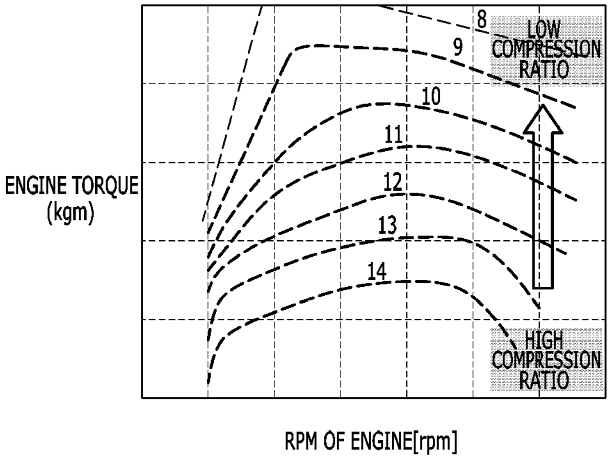
FIG. 3 is a graph illustrating relation among compression ratio, a revolution per minute (RPM) of an engine, and engine torque according to embodiments of the present disclosure.

FIG. 3 is a graph illustrating relation among compression ratio, a revolution per minute (RPM) of an engine, and engine torque according to embodiments of the present disclosure.

As shown in FIG. 3, the horizontal axis represents RPM and the vertical axis represents output torque of the engine, and engine torque according to a high compression ratio and a low compression ratio is illustrated. Here, the compression ratio relates to engine torque.

Figure 4:
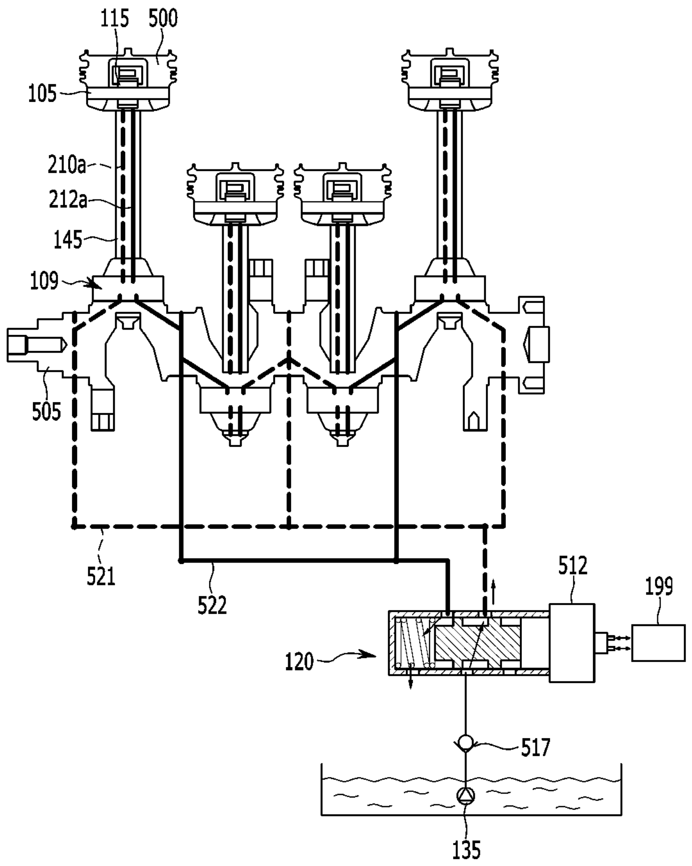
FIG. 4 is a view schematically illustrating flow of a hydraulic fluid in a variable compression ratio device according to embodiments of the present disclosure.

FIG. 4 is a view schematically illustrating a flow of hydraulic fluid in a variable compression ratio device according to embodiments of the present disclosure.

As shown in FIG. 4, the variable compression ratio device includes an oil pump 135, a check valve 517, an oil control valve 120, an actuator 512, a compression ratio controller 199, a first control line 521, a second control line 522, a crank shaft 505, a spool valve 109, a connecting rod 145, a first chamber connection passage 210*a*, a second chamber connection passage 212*qa*, a piston pin 105, a piston 500, and an eccentric cam 115.

The oil pump 135 pumps oil present in an oil tank, and the check valve 517 prevents pumped oil from flowing backwards to the oil pump 135.

The oil control valve 120 is operated by the actuator 512, and the actuator 512 is controlled by the compression ratio controller 199.

The oil control valve 120 may transmit a hydraulic fluid transmitted from the oil pump 135 to the spool valve 109 through the first control line 521 or may transmit the hydraulic fluid to the spool valve 109 through the second control line 522 according to operation modes.

Within the connecting rod 145, a first chamber connection passage 210*a* connecting one side of the spool valve 109 and the first chamber (155 of FIG. 5) and a second chamber connection passage 212*a* connecting the other side of the spool valve 109 and the second chamber (157 of FIG. 5) are formed.

Using a hydraulic fluid transmitted by the oil control valve 120, the spool valve 109 controls each of the hydraulic fluids passing through the first chamber connection passage 210*a* and the second chamber connection passage 212*a* to control a rotation position of the eccentric cam 115.

Also, a vertical position of the piston 500 is varied with respect to the piston pin 105 according to a rotation position of the eccentric cam 115.

In embodiments of the present disclosure, the spool valve 109 may perform a function of a generally known crank pin (not shown).

In addition, the spool valve 109 may be disposed as a separate component, rather than replacing the crank pin.

Detailed structures of the spool valve 109, the oil pump 135, the actuator 512, and the like, may refer to a known art.

FIG. 5 is a partial cross-sectional view illustrating a variable compression ratio device according to embodiments of the present disclosure.

As shown in FIGS. 4 and 5, an upper end portion of the connecting rod 145 is inserted into a recess formed in a lower portion of the piston 500 and the piston pin 105 penetrates through the piston 500 and an upper end portion of the connecting rod 145 to connect the piston 500 and the connecting rod 145.

The eccentric cam 115 is formed between an inner circumferential surface of the connecting rod 145 and an outer circumferential surface of the piston pin 105. A rotation center of the eccentric cam 115 and a rotation center of the piston pin 105 are eccentric from each other, and the piston 500 may move up and down according to a rotation position of the eccentric cam 115.

A recess 502 is formed on an outer surface of the eccentric cam 115, a protrusion 150 is formed on one side of an inner circumferential surface of the connecting rod 145 to divide the recess 502 into a first chamber 155 and a second chamber 157, and a sealing member 152 sealing the first chamber 155 and the second chamber 157 is installed at a front end portion of the protrusion 150.

When pressure at the first chamber connection passage **210*a* is increased according to an operation of the oil control valve 120 and the spool valve 109, a hydraulic fluid is supplied to the first chamber 155 and the eccentric cam 115 rotates in a clockwise direction to cause the piston 500 to ascend in height as illustrated on the right side of FIG. 5**.

Conversely, when pressure at the second chamber connection passage **212*a* is increased according to an operation of the oil control valve 120 and the spool valve 109, a hydraulic fluid is supplied to the second chamber 157 and the eccentric cam 115 rotates in a counterclockwise direction to cause the piston 500 descends in height as illustrated on the left side of FIG. 5**.

Here, in order to stop rotation of the eccentric cam 115 at a set angle, the oil control valve 120 may not supply a hydraulic fluid to the first control line 521 and the second control line 522.

In embodiments of the present disclosure, a first sensor element 452 is provided at a lower end of the piston 500 and a second sensor element 450 is fixed to and mounted on one side of a cylinder of the engine. Here, the second sensor element 450 is disposed in a movement route of the first sensor element 452.

The first sensor element 452 may be formed of a magnetic material with magnetism, and the second sensor element 450 may be formed as an element sensing magnetism.

Figure 6:
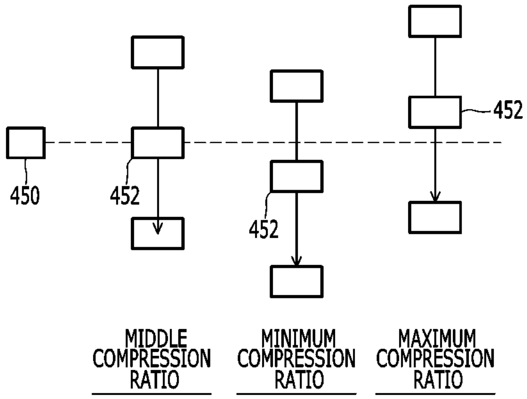
FIG. 6 is a view schematically illustrating behaviors of a piston according to compression ratios in a variable compression ratio device according to embodiments of the present disclosure.

FIG. 6 is a view schematically illustrating behaviors of a piston according to compression ratios in a variable compression ratio device according to embodiments of the present disclosure.

As shown in FIG. 6, when a minimum compression ratio is implemented by the height of the piston 500, a height of the first sensor element 452 is lowered together with the piston 500.

Also, when a maximum compression ratio is implemented by the height of the piston 500, the first sensor element 452 ascends in height together with the piston 500, and when a middle compression ratio is implemented by the height of the piston 500, the height of the first sensor element 452 is adjusted to a middle position together with the piston 500.

Figure 7:
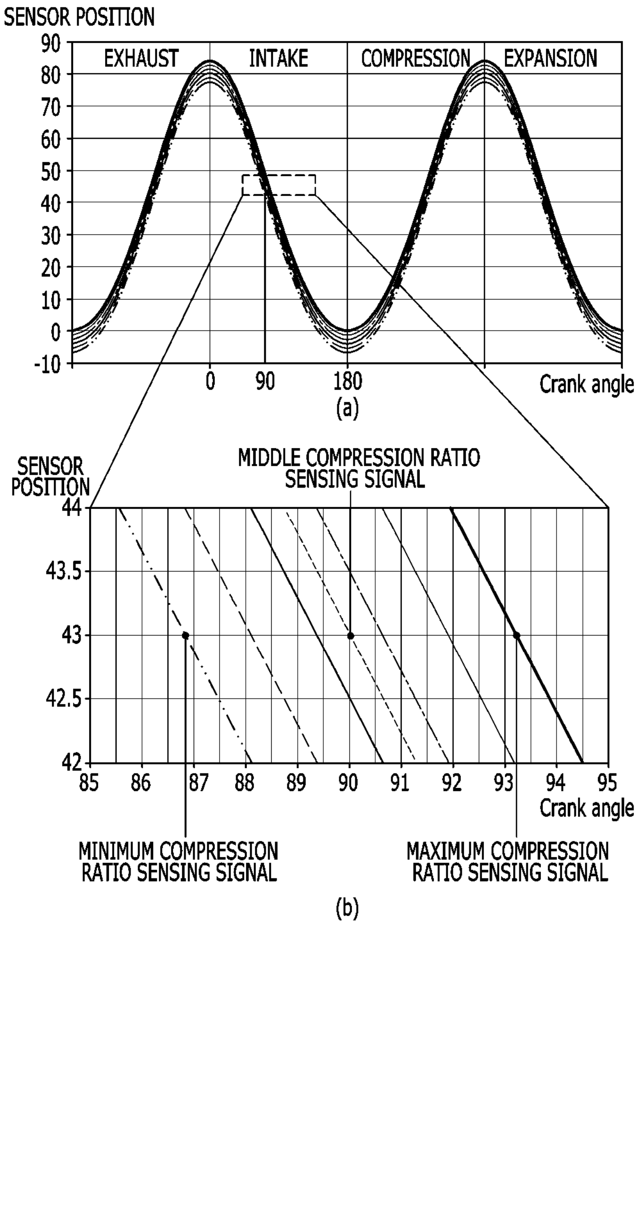
FIG. 7 is a graph illustrating behaviors of a piston and crank angle according to compression ratios in a variable compression ratio device according to embodiments of the present disclosure.

FIG. 7 is a graph illustrating behaviors of a piston and crank angle according to compression ratios in a variable compression ratio device according to embodiments of the present disclosure.

Referring to (a) of FIG. 7, the horizontal axis represents crank angles indicating rotation positions of the crank shaft 505, and the vertical axis represents positions of the piston 500, specifically, positions of the first sensor element 452 disposed in the piston 500.

Referring to (b) of FIG. 7, with respect to the minimum compression ratio, a point at which the second sensor element 450 senses the first sensor element 452 is about 86.8°.

Also, with respect to the middle compression ratio, a point at which the second sensor element 450 senses the first sensor element 452 is about 90°, and with respect to the maximum compression ratio, a point at which the second sensor element 450 senses the first sensor element 452 is about 93.2°.

FIG. 8 is a table illustrating crank angles at which a first sensor element is sensed according to compression ratios of FIG. 7.

As shown in FIG. 8, compression ratios are implemented according to positions of the piston 500, and a maximum compression ratio is 13 and a minimum compression ratio is 8. Here, it is understood that the maximum compression ratio and the minimum compression ratio are modified according to design specifications of the engine.

With respect to the maximum compression ratio, a crank angle at which the second sensor element 450 senses the first sensor element 452 is about 93.2°, and with respect to the minimum compression ratio, a crank angle at which the second sensor element 450 senses the first sensor element 452 is about 86.8°.

In addition, with respect to the middle compression ratio, a point at which the second sensor element 450 senses the first sensor element 452 is about 90°.

In embodiments of the present disclosure, the fact that the point at which the second sensor element 450 senses the first sensor element 452 is changed on the basis of crank angles according to compression ratios may refer to the contents of FIGS. 6 and 7.

Figure 9:
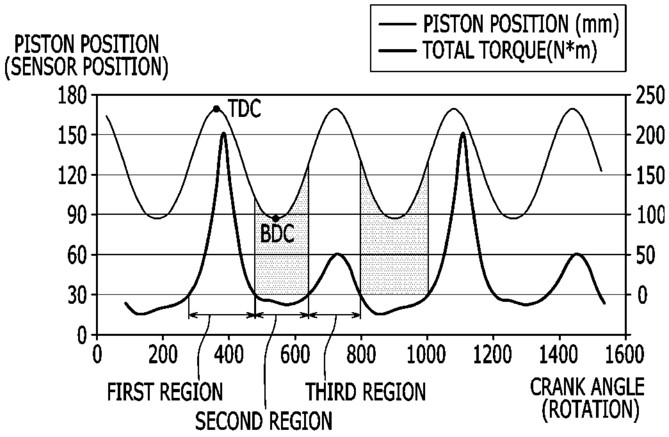
FIG. 9 is a graph illustrating behaviors of a piston and torque applied to an eccentric camp according to crank angles in a variable compression ratio device according to embodiments of the present disclosure.

FIG. 9 is a graph illustrating behaviors of a piston and torque applied to an eccentric camp according to crank angles in a variable compression ratio device according to embodiments of the present disclosure.

As shown in FIG. 9, the horizontal axis represents crank angles and the vertical axis represents behaviors of the piston 500 and torque applied to the eccentric cam 115.

The piston 500 repeatedly moves between a top dead center (TDC) and a bottom dead center (BDC) according to an intake operation, an exhaust operation, a compression operation, and an expansion operation of the combustion chamber.

Also, in a first region, the piston 500 forms torque in a counterclockwise direction in the eccentric cam 115, in a second region, the piston 500 forms torque in a clockwise direction in the eccentric cam 115, and in a third region, the piston 500 forms torque in a counterclockwise direction in the eccentric cam 115.

The first region corresponds to the compression and expansion operation to correspond to a TDC, the second region corresponds to the expansion and exhaust operation to correspond to a BDC, and the third region corresponds to the exhaust and expansion operation to correspond to a next TDC.

As illustrated, a region in which relative small torque is formed in the eccentric cam 115 corresponds to a region in which the piston 500 is positioned in the BDC portion.

Figure 10A:
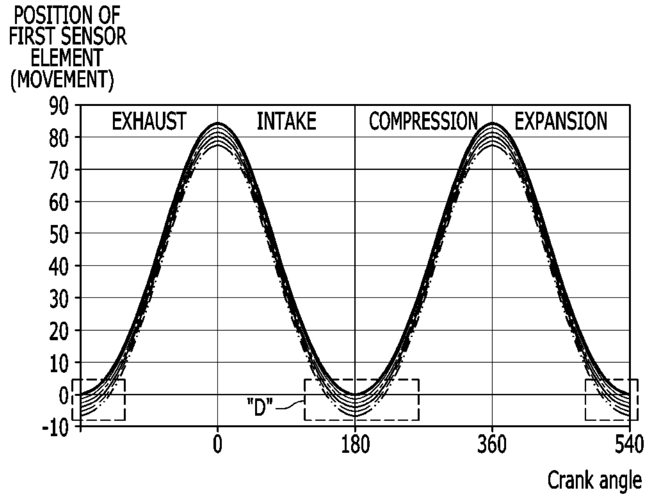
FIGS. 10A and 10B are detailed graphs illustrating crank angle and behaviors of a piston in a variable compression ratio device according to embodiments of the present disclosure.
Figure 10B:
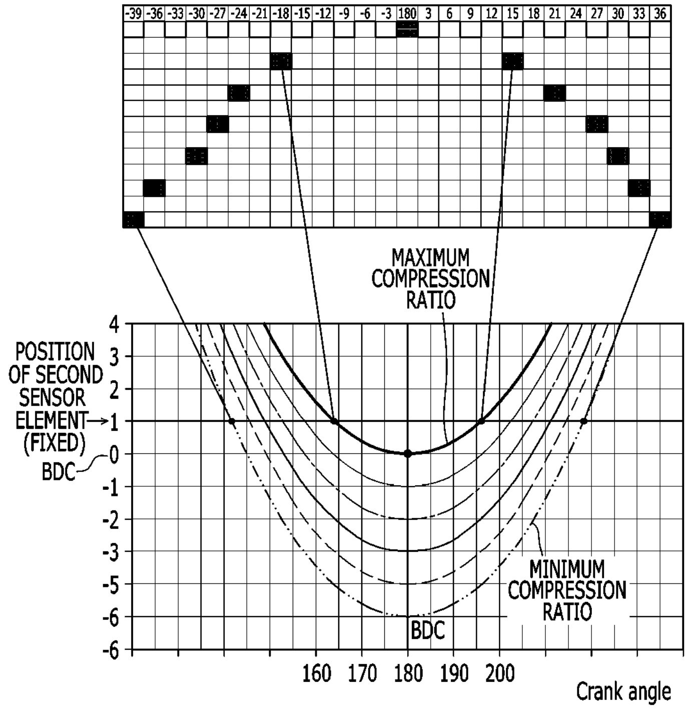

FIGS. 10A and 10B are detailed graphs illustrating crank angle and behaviors of a piston in a variable compression ratio device according to embodiments of the present disclosure.

As shown in FIG. 10A, the horizontal axis represents crank angles indicating rotation positions of the crank shaft 505, and the vertical axis represents positions of the piston 500, specifically, positions of the first sensor element 452 disposed in the piston 500.

In FIG. 10B, the lower drawing illustrates an enlarged view of the portion ‘d’ of FIG. 10A, in which, on the basis of the maximum compression ratio, a BDC position is set to 0 and the second sensor element 450 is positioned in a point 1 mm higher than the reference position.

Here, the second sensor element 450 is installed at a point 1 mm higher than the BDC, but the height may be modified according to design specifications. However, referring to FIG. 9, preferably, it is a height corresponding to a region in which torque applied to the eccentric cam 115 is 0.

As illustrated in the upper drawing of FIG. 10B, with respect to the minimum compression ratio, points where the second sensor element 450 senses the first sensor element 452 are about 141° (180–39) in a descending region and 216° (180+36) in an ascending region.

Also, with respect to the maximum compression ratio, points where the second sensor element 450 senses the first sensor element 452 are about 162° (180–18) in the descending region and 195° (180+15) in the ascending region. FIG. 11 is a table illustrating time points at which a first sensor element is sensed in a variable compression ratio device according to embodiments of the present disclosure.

As shown in FIGS. 10A, 10B, and 11, a reference position is 180° as a crank angle, and with respect to the maximum compression ratio, a sensing position at the time of descending is 163° and a sensing position at the time of ascending is 195°. Accordingly, a duration value, a difference value therebetween, is 32°.

Similarly, with respect to the minimum compression ratio, a sensing position at the time of descending is 142° and a sensing position at the time of ascending is 217°. Accordingly, a duration value, a difference value (217-14) therebetween is 75°.

In this manner, when the duration value, i.e., the difference value between the sensing point at which the first sensor element 452 descends and the sensing point at which the first sensor element 452 ascends is known, a current compression ratio may be indirectly calculated.

In embodiments of the present disclosure, a current compression ratio may be calculated using the duration value, a target compression ratio according to operating conditions may be calculated, and a compression ratio may be varied such that the current compression ratio may reach the target compression ratio.

Figure 12:
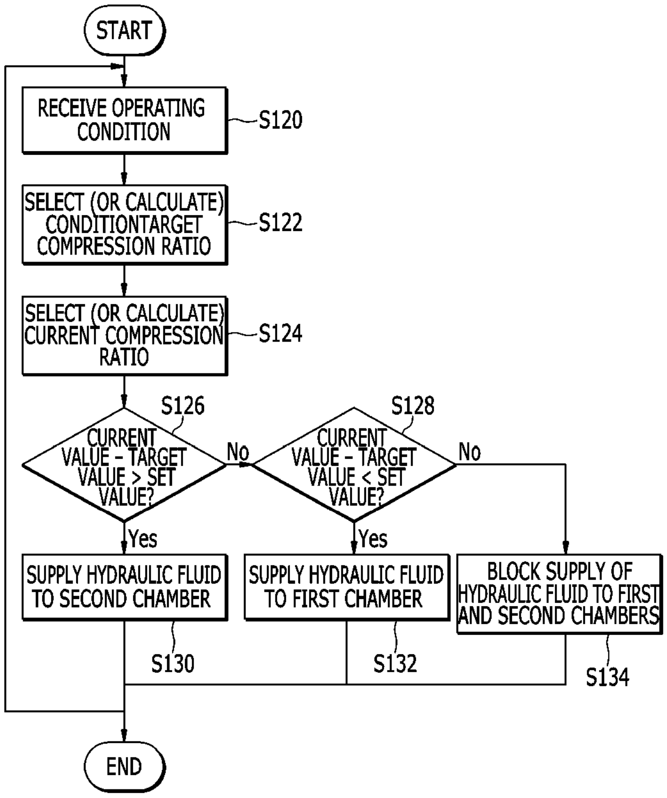
FIG. 12 is a flow chart illustrating a method for controlling a variable compression ratio device according to embodiments of the present disclosure.

FIG. 12 is a flow chart illustrating a method for controlling a variable compression ratio device according to embodiments of the present disclosure.

As shown in FIG. 12, controlling starts and operating conditions are input in operation S120. The operating conditions of the engine may include an injection amount of fuel, a load, an RPM of the engine, and the like.

In operation S122, a target compression ratio is selected or calculated from the input operating conditions, and in operation S124, a current compression ratio is selected or calculated using the information described above with reference to FIGS. 7 to 11.

In operation S126, when a value obtained by subtracting the target compression ratio (i.e., target value) from the current compression ratio (i.e., current value) is greater than a preset value, operation S130 is performed, or otherwise, operation S128 is performed. In operation S130, the current compression ratio is reduced by supplying a hydraulic fluid to the second chamber 157.

In operation S128, when the value obtained by subtracting the target compression ratio (i.e., target value) from the current compression ratio (i.e., current value) is smaller than the set value, operation S132 is performed, or otherwise, operation S134 is performed. In operation S132, the current compression ratio is increased by supplying the hydraulic fluid to the first chamber 155. Also, in operation S134, the current compression ratio is maintained by blocking the hydraulic fluid transmitted to the first chamber 155 and the second chamber 157.

In embodiments of the present disclosure, when an absolute value of a difference value between the current compression ratio and the target compression ratio does not deviate from the set value, the current compression ratio may be maintained as is, and when the absolute value of the difference value deviates from the set value, the current compression ratio may be controlled to be changed to be close to the target compression ratio.

While this disclosure has been described in connection with certain embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

| | |
|---|---|
| 100: position sensor | 105: piston pin |
| 109: spool valve | 110: crank angle sensor |
| 115: eccentric cam | 120: oil control valve |
| 135: oil pump | 145: connecting rod |
| 150: protrusion | 152: sealing member |
| 155: first chamber | 157: second chamber |
| 199: compress ratio controller | 200: hydraulic controller |
| 210a: first chamber connection passage | |
| 212a: second chamber connection passage | |
| 452: first sensor element | 450: second sensor element |
| 500: piston | 502: recess |
| 505: crank shaft | 512: actuator |
| 517: check valve | 521: first control line |
| 522: second control line | |

What is claimed is:

1. A variable compression ratio device comprising:

a connecting rod connected to a piston disposed in a cylinder through a piston pin;

an eccentric cam interposed between the piston pin and the connecting rod, the eccentric cam moving the piston up and down to vary a compression ratio according to a rotation position of the eccentric cam;

a hydraulic controller controlling hydraulic fluid supplied to each of first and second chambers formed between the eccentric cam and the connecting rod, the first chamber rotating the eccentric cam in one direction by supplied hydraulic fluid, and the second chamber rotating the eccentric cam in another direction by the supplied hydraulic fluid;

a position sensor sensing a position of the piston; and a compression ratio controller calculating a target compression ratio according to an operating condition of an engine, calculating a current compression ratio based on the piston using a signal sensed by the position sensor, and controlling the rotation position of the eccentric cam through an oil control valve to cause the current compression ratio to reach the target compression ratio, wherein the compression ratio controller varies the rotation position of the eccentric cam according to a difference between the calculated target compression ratio and the calculated current compression ratio.

2. The variable compression ratio device of claim 1, further comprising:

a crank pin of a crank shaft connected to an end of the connecting rod; and a crank angle sensor sensing a rotation position of the crank shaft.

3. The variable compression ratio device of claim 2, wherein the position sensor includes:

a first sensor element fixed to a side of the piston; and a second sensor element mounted on the engine and configured to sense a position of the first sensor element.

4. The variable compression ratio device of claim 3, wherein:

the second sensor element is disposed in a region in which the first sensor element descends and ascends in correspondence with a movement of the piston.

5. The variable compression ratio device of claim 4, wherein:

the second sensor element is fixed to and disposed in a position higher than a bottom dead center (BDC) of the second sensor element by a preset distance.

6. The variable compression ratio device of claim 4, wherein:

the compression ratio controller calculates: i) a first crank angle at a point at which the second sensor senses the first sensor when the first sensor element descends, ii) a second crank angle at a point at which the second sensor element senses the first sensor element when the first sensor element, which has descended, ascends, and iii) the current compression ratio as according to a difference between the first crank angle and the second crank angle.

7. The variable compression ratio device of claim 2, wherein:

the compression ratio controller calculates the target compression ratio based on a rotation speed of the crank shaft and a target injection amount of fuel.

8. The variable compression ratio device of claim 2, wherein:

the connecting rod has a first chamber connection passage connected to the first chamber and a second chamber connection passage connected to the second chamber.

9. The variable compression ratio device of claim 2, wherein:

a recess to which hydraulic fluid is supplied is provided on a side of an outer circumferential surface of the eccentric cam, and a protrusion dividing the recess into the first chamber and the second chamber is provided on an inner circumferential surface of the connecting rod.

10. The variable compression ratio device of claim 9, wherein:

a sealing member sliding to an inner surface of the recess and sealing the first chamber and the second chamber from each other is disposed at a front end of the protrusion.

11. The variable compression ratio device of claim 1, wherein the hydraulic controller includes:

a spool valve supplying hydraulic fluid to the first chamber or the second chamber;

an oil control valve controlling the spool valve; and an oil pump pumping hydraulic fluid to the oil control valve.

12. The variable compression ratio device of claim 3, wherein:

the first sensor element includes a magnetic component, and the second sensor element includes an element sensing magnetism.

13. A method for controlling a variable compression ratio device, the method comprising:

sensing, by a position sensor, a position signal of a piston;

calculating, by a compression ratio controller, a current compression ratio using the position signal of the piston;

calculating, by the compression ratio controller, a target compression ratio according to an operating condition of an engine;

calculating, by the compression ratio controller, a difference between the calculated current compression ratio and the calculated target compression ratio; and controlling, by the compression ratio controller, a compression ratio of the piston according to the calculated difference to cause the current compression ratio to reach the target compression ratio.

14. The method of claim 13, wherein the calculating of the current compression ratio comprises:

calculating, by the compression ratio controller, a duration value between a first point at which the piston descends and a second point at which the piston, which has descended, ascends; and calculating, by the compression ratio controller, the current compression ratio so as to correspond to the duration value.

15. The method of claim 14, wherein:

the first point and the second point are first and second crank angles, respectively, of the crank shaft, and the duration value is a difference of the first and second crank angles.

16. The method of claim 13, wherein:

the target compression ratio is calculated based on at least one of an RPM of the engine, an injection amount of fuel, and an operation load.

17. The method of claim 13, further comprising:

maintaining, by the compression ratio controller, the current compression ratio when an absolute value of a difference between the current compression ratio and the target compression ratio does not deviate from the set value; and changing, by the compression ratio controller, the current compression ratio so as to correspond to the target compression ratio when the absolute value of the difference value deviates from the set value.

* * * * *